(12) United States Patent
Linnane et al.

(10) Patent No.: US 8,795,460 B2
(45) Date of Patent: Aug. 5, 2014

(54) INDEXABLE CUTTER INSERT, CONSTRUCTION FOR SAME AND METHOD FOR MAKING SAME

(75) Inventors: Stephen James Linnane, County Clare (IE); Terry Scanlon, County Clare (IE); Joseph Anthony McCloskey, County Clare (IE)

(73) Assignee: Element Six Limited, County Clare (IE)

( * ) Notice: Subject to any disclaimer, the term of this patent is extended or adjusted under 35 U.S.C. 154(b) by 0 days.

(21) Appl. No.: 13/807,483

(22) PCT Filed: Jul. 11, 2011

(86) PCT No.: PCT/EP2011/061769
§ 371 (c)(1),
(2), (4) Date: Jul. 9, 2013

(87) PCT Pub. No.: WO2012/007429
PCT Pub. Date: Jan. 19, 2012

(65) Prior Publication Data
US 2013/0276970 A1    Oct. 24, 2013

Related U.S. Application Data

(60) Provisional application No. 61/363,798, filed on Jul. 13, 2010, provisional application No. 61/485,921, filed on May 13, 2011.

(30) Foreign Application Priority Data

Jul. 13, 2010 (GB) .................................. 1011728.1
May 13, 2011 (GB) .................................. 1108007.4

(51) Int. Cl.
*B32B 37/00* (2006.01)
*B32B 37/10* (2006.01)
*B32B 37/12* (2006.01)
*B32B 38/00* (2006.01)

(52) U.S. Cl.
CPC ................ *B32B 37/10* (2013.01); *B32B 37/12* (2013.01); *B32B 38/0004* (2013.01)
USPC .......................................... 156/228; 156/252

(58) Field of Classification Search
CPC .... B32B 37/10; B32B 37/12; B32B 38/0004; B29C 65/002; B29C 65/004
USPC .......................... 156/228, 250, 252, 510, 580
See application file for complete search history.

(56) References Cited

U.S. PATENT DOCUMENTS 4,403,015 A    9/1983    Nakai et al.
4,522,633 A    6/1985    Dyer
(Continued)

FOREIGN PATENT DOCUMENTS

EP    0019461 A1    11/1980
EP    0480878 A2    4/1992
(Continued)

*Primary Examiner* — James Sells
(74) *Attorney, Agent, or Firm* — Bryan Cave LLP

(57) ABSTRACT

A method of making a construction for an indexable cutter insert, the method including providing a wafer (20) comprising ceramic material, the wafer (20) being substantially unsupported by a cemented carbide substrate and having a mean thickness of at most 2 mm; providing an insert base (30) having proximate and distal major ends (33, 34) connected by peripheral sides (36), the proximate end (33) of the insert base (30) being configured to have at least two corners (35) defined by junctions of the peripheral sides (36); the wafer (20) being configured to have at least two corners (25) corresponding to the two corners (35) of the proximate end (33) of the insert base (30); the method including bonding the wafer (20) to the proximate end (33) by means of a bond material, the corners (25) of the wafer (20) being disposed adjacent the corresponding corners (35) of the proximate end (33) to provide the construction.

12 Claims, 5 Drawing Sheets

(56) References Cited

U.S. PATENT DOCUMENTS

| | | | |
|---|---|---|---|
| 4,636,116 A * | 1/1987 | Shikata | 407/103 |
| 5,009,673 A | 4/1991 | Cho | |
| 5,366,522 A | 11/1994 | Nakamura et al. | |
| 5,370,195 A | 12/1994 | Keshavan et al. | |
| 5,389,118 A | 2/1995 | Hinterman et al. | |
| 5,500,248 A | 3/1996 | Iacovangelo et al. | |
| 5,626,909 A | 5/1997 | Iacovangelo | |
| 5,647,878 A | 7/1997 | Iacovangelo et al. | |
| 7,857,557 B2 * | 12/2010 | Lehmann et al. | 408/153 |
| 2002/0034632 A1 | 3/2002 | Griffin et al. | |
| 2004/0238946 A1 | 12/2004 | Tachibana et al. | |
| 2005/0050801 A1 | 3/2005 | Cho et al. | |
| 2005/0210755 A1 | 9/2005 | Cho et al. | |
| 2005/0271483 A1 | 12/2005 | Sjogren | |
| 2009/0080984 A1 | 3/2009 | Lehmann et al. | |

FOREIGN PATENT DOCUMENTS

| | | |
|---|---|---|
| EP | 0703032 A1 | 3/1996 |
| EP | 714719 A1 | 5/1996 |
| EP | 1561737 A1 | 8/2005 |
| EP | 1930306 A1 | 6/2008 |
| WO | 00/34001 A1 | 6/2000 |
| WO | 2004/028746 A2 | 4/2004 |
| WO | 2005/068129 A1 | 7/2005 |

* cited by examiner

INDEXABLE CUTTER INSERT, CONSTRUCTION FOR SAME AND METHOD FOR MAKING SAME

The disclosure relates generally to a construction for an indexable cutter insert for a machine tool, an assembly for same and method for making same.

U.S. Pat. No. 7,857,557 discloses an indexable insert provided with a coating structure comprising two layers: an outer layer comprising a cutting material such as cBN or diamond joined to an inner layer comprising carbide. The layer structure may be applied on an insert base body by brazing, prior to which the layer structure is manufactured as a sintered compact.

There is a need for an indexable cutter insert for a machine tool capable of high productivity in use, and for an efficient method for making same.

Viewed from a first aspect there can be provided a method of making a construction for an indexable cutter insert, the method including providing a wafer comprising ceramic material, the wafer being substantially unsupported by a substrate and having a mean thickness of at most about 2 mm or at most about 1 mm; providing an insert base (which may also be referred to herein as a substrate) having proximate and distal major ends connected by peripheral sides (that meet at corner junctions), the proximate end of the insert base being configured to have at least two corners (or apexes or vertices) defined by the junctions between the peripheral sides; the wafer being configured to have at least two corners (for providing cutting edges) corresponding to the two corners of the proximate end of the insert base; the method including bonding the wafer to the proximate end of the insert base by means of a bond material (such as a braze alloy material), the corners of the wafer being disposed adjacent (i.e. substantially above) the corresponding corners of the proximate end. The corners may be rounded or otherwise arcuate in a plane substantially parallel to at least a region of the proximate end adjacent the corner; or the corner may be substantially sharp or pointed in the plane. The proximate end may include a pocket for accommodating the wafer, which pocket may include the two corners of the proximate end, and or a guide means such as a boss for locating the wafer. In some example arrangements, the proximate end of the insert base may have at least three or at least four corners defined by the junctions of the peripheral sides and the wafer may be configured to have at least three or at least four corners corresponding to the corners of the proximate end of the insert base.

Viewed from a second aspect, there can be provided a method of making a wafer for a disclosed construction (for an indexable cutter insert), the method including providing a precursor body comprising ceramic material and having a first thickness between a pair of opposite major end surfaces; cutting the precursor body into a plurality of sub-structures to provide at least one sub-structure having a second thickness between a pair of opposite major sub-structure surfaces; the second thickness being less than the first thickness; and processing the substructure (for example, by grinding, polishing or further cutting to achieve desired dimensions or tolerances) to provide the wafer.

Various ceramic materials are envisaged by the disclosure. For example, the ceramic material may be advanced ceramic material or super-hard material, such as PCBN material, PCD material, thermally stable PCD material or SiC-bonded diamond material. The ceramic material may be capable of being cut by electro-discharge means (the material may be electrically conducting). For example, the ceramic material may comprise cBN grains dispersed in a matrix comprising titanium carbonitride material, and the ceramic material may comprise at least about 35 volume percent, or at least about 50 volume percent cBN, and or at most about 93 volume percent, at most about 80 volume percent or at most about 70 volume percent cBN. In a particular example, the content of the cBN grains may be at least about 70 volume percent of the super-hard material.

Various arrangements and combinations are envisaged by the disclosure for the precursor body and sub-structure. For example, the opposite major surfaces of the precursor body may be substantially planar, and or the opposite major surfaces of the sub-structure may be substantially planar. The precursor body may be cut into two to ten substructures, each having a volume of substantially 50% down to 10% respectively, of the volume of the precursor body. In some example arrangements, the major sub-structure surfaces may be cut to correspond to a major surface of the precursor body, the major sub-structure surfaces being substantially parallel to or inclined at an angle of at most about 45 degrees to at least one of the major surfaces of the precursor body; or the major sub-structure surfaces may be substantially perpendicular to or inclined at an angle of at least about 45 degrees to at least one of the major surfaces of the precursor body. In some examples, the first thickness may be measured between a pair of opposite major surfaces of the precursor body and the second thickness is measured between corresponding surfaces of the sub-structure. In one example arrangement, at least one major surface of the precursor body may be substantially planar. The precursor body may have a pair of substantially planar major end surfaces connected by a side surface, the method including cutting the precursor body generally parallel to at least one of the major end surfaces to provide at least two polygonal or round discs. An example method may include cutting the precursor body generally parallel to at least one of its major ends to provide at least two, at least four or at least five sheet-like sub-structures.

Various example arrangements and combinations are envisaged for the precursor body. The precursor body may be in the shape of a disc or solid cylinder, or it may be generally cuboid or rhombohedral in shape, and it may have a diameter or edge length of at least about 2 cm, at least about 3 cm or at least about 5 cm, and a thickness of at least about 0.5 cm or at least about 1 cm. The precursor body may have a volume of at least about 10 cm$^3$. The precursor body may be generally cylindrical in shape and have a diameter of at least about 5 cm. The pre-cursor body may have a pair of substantially planar opposite major ends connected by a side surface, and or the precursor body may be substantially free-standing, self-supporting and free of a cemented carbide substrate.

Various example arrangements and combinations are envisaged for the sub-structure. For example, the sub-structure may have a mean thickness of at most about 4 mm, at most about 2 mm, at most about 1.6 mm, at most about 1 mm or at most about 0.5 mm. The sub-structure may be in the general form of a circular or round disc, or polygonal disc, such as square, rectangular or triangular disc, or it may be in the from of a closed or open ring, or it may be generally U-shaped, V-shaped or semi-circular as viewed form above a major surface. The sub-structure may be provided with a through-hole, which may have a relatively large area so that the sub-structure may resemble a polygonal ring in plan view, such as a generally square or triangular ring.

In some example arrangements, the insert base may have a taper formed into an edge of a major end, the taper angle being at about 7 degrees, about 11 degrees or about 15 degrees, or at least about 7 degrees and at most about 15 degrees from a plane defined by a major end surface (in other words, a major end of the insert base may have a tapered edge depending from the end).

In some example arrangements, at least one peripheral edge of the insert base is inclined at an internal angle of at least 20 degrees and at most 80 degrees with respect to the proximate end, the peripheral edge being formed at the junction between the proximate end and a peripheral side.

The wafer may have a pair of opposite major surfaces connected by a peripheral side surface, the insert base having a major surface; and the method may include configuring the wafer such that the major surfaces of the wafer have an area of at least about 50 percent, at least about 70 percent, at least about 90 percent or substantially 100 percent of the area of the major surface of the insert base.

Various example arrangements and combinations of approaches are envisaged for methods. For example, a method may include providing an insert base having a through-hole between the proximate and distal ends, forming a through-hole into the wafer, arranging the wafer and the insert base such that the respective through-holes are substantially co-axial, and bonding the wafer to the substrate by means of a bond material. A method may include forming the through-hole into the sub-structure prior to processing the pre-cursor body to provide the wafer. The wafer may be bonded to the insert base by means of diffusion bonding, an adhesive material, or by brazing using a braze alloy material for example.

Viewed from a third aspect, there can be provided a construction for an indexable cutter insert suitable for mounting onto a machine tool, comprising at least two corners, each corner formed at the junction of respective peripheral edges of the construction, the corners connected by the same continuous ceramic wafer joined to an insert base by means of a bond layer comprising a bond material. In some example arrangements, the ceramic wafer may have a mean thickness of at most about 4 mm, at most about 2 mm, at most about 1.6 mm, at most about 1 mm or at most about 0.5 mm.

Viewed from a fourth aspect, there can be provided an assembly for a construction, comprising a ceramic wafer and an insert base for supporting the ceramic wafer, the insert base and the ceramic wafer each having a respective through-hole and configured such that the ceramic wafer can be placed against the insert base with the respective through-holes being substantially co-axial.

Various example arrangements and combinations are envisaged for disclosed constructions. In some example arrangements, at least one peripheral edge may be formed at the junction between a major surface and a side surface of the construction, the internal angle between the major surface and the side surface being at most about 80 degrees or at most about 70 degrees. The internal angle between the major surface and the side surface may be at least about 20 degrees or at least about 30 degrees. The internal angle between the major surface and the side surface may be an acute angle operable to use the cutting edge formed onto the peripheral edge at a positive rake angle. The construction may include a through-hole for receiving a holder means, such as a clamping screw, the through-hole passing through the substrate and the ceramic wafer. The through-hole of the insert base and or of the ceramic wafer may be substantially circular in cross-section. The diameter of the through-hole of the ceramic wafer may be greater than the diameter of the through-hole of the insert base. In one example arrangement, the insert base may comprise a guide means for locating the ceramic wafer when the ceramic wafer is positioned against the inset base.

The guide means may comprise a protrusion from a major surface of the insert base, and the protrusion may be adjacent the perimeter of the through-hole of the insert base. The guide means may comprise a generally circular or semi-circular projection from the insert base, at least partly surrounding the insert base through-hole.

Viewed from another aspect, there can be provided an indexable cutter insert for mounting onto a machine tool, comprising a construction as disclosed and having at least two primary cutting edges, each adjacent a respective corner and both formed by the same continuous ceramic wafer joined to an insert base by means of a bond layer comprising a bond material. In example arrangements, the indexable cutter insert may comprise three or four cutting edges, each adjacent a respective corner and both formed by the same continuous ceramic wafer joined to a cemented carbide substrate by means of a bond layer. The indexable cutter insert may be for a machine tool such as a lathe for machining a workpiece comprising metal, and in one embodiment.

Viewed from another aspect, there can be provided a method of making an indexable cutter insert, the method including providing a cemented carbide insert base having a through-hole between two opposite surfaces; providing a body comprising PCBN material and sawing off a portion of the body to provide a PCBN wafer; forming a through-hole into the PCBN wafer; arranging the PCBN wafer and the substrate such that the respective through-holes are substantially co-axial; disposing a layer of braze alloy material between a surface of the substrate and the PCBN wafer; and brazing the PCBN wafer to the substrate. The method may include using an EDM apparatus to saw off the portion of the body and the PCBN wafer may have a mean thickness of at most about 1.6 mm or at most 1 mm. In a particular example, the insert base may be provided with a taper formed into an edge of a major end, the taper angle being about 7 degrees, about 11 degrees or about 15 degrees from a plane defined by the major end.

Viewed from yet another aspect, there can be provided a method of making a construction for an indexable cutter insert, the method including providing an insert base having a through-hole between two opposite major surfaces; providing a ceramic wafer that substantially un-backed or unsupported by a support body such as a cemented carbide substrate (i.e. a substantially self-supporting, free-standing wafer); forming a through-hole into the wafer; arranging the ceramic wafer and the substrate such that the respective through-holes are substantially co-axial, and bonding the ceramic wafer to the substrate by means of a bond material.

Disclosed example methods are likely to have enhanced manufacturing efficiency by reducing material wastage and improving utilisation of ceramic material sintering equipment. Some example methods are likely to reduce the cost of providing a through-hole and some disclosed example constructions may have the aspect of enhanced fracture resistance. While wishing not to be bound by a particular theory, this may arise because residual stress within the cutter insert may be reduced by joining the wafer to the insert base by a selected means, rather than by integrally forming the wafer onto a substrate at high temperature and then cooling it. Some example arrangements may have the further aspect that the wafer may be protected from being impinged by a clamping screw when being mounted onto a machine tool. Consequently, some example inserts are likely to have enhanced robustness against cracking during handling and use.

Non-limiting example arrangements will now be described with reference to the accompanying drawings, of which:

Figure 1A:
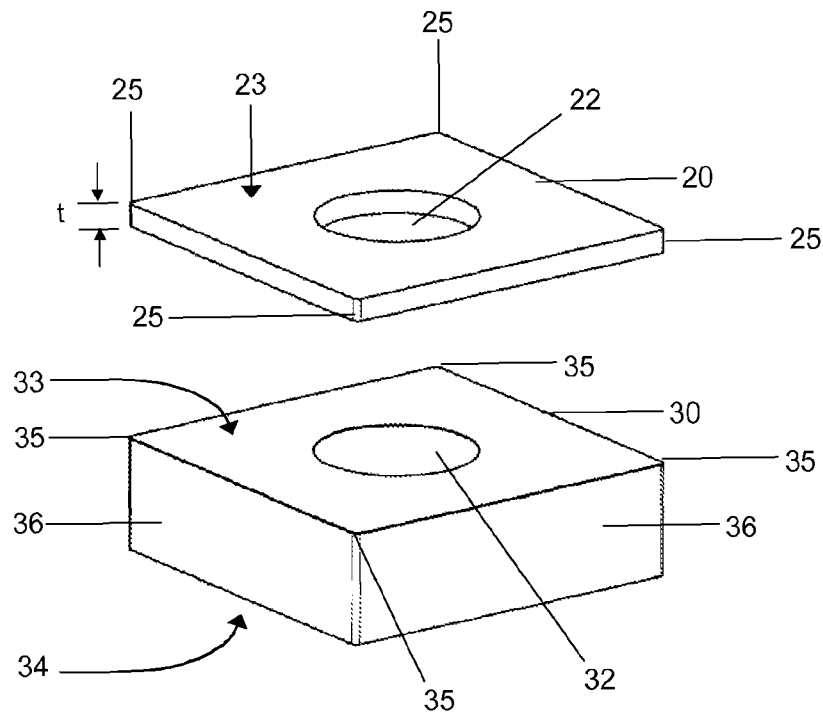
FIG. 1A and FIG. 2A show schematic perspective views of assemblies for example constructions in an unassembled condition.
Figure 1B:
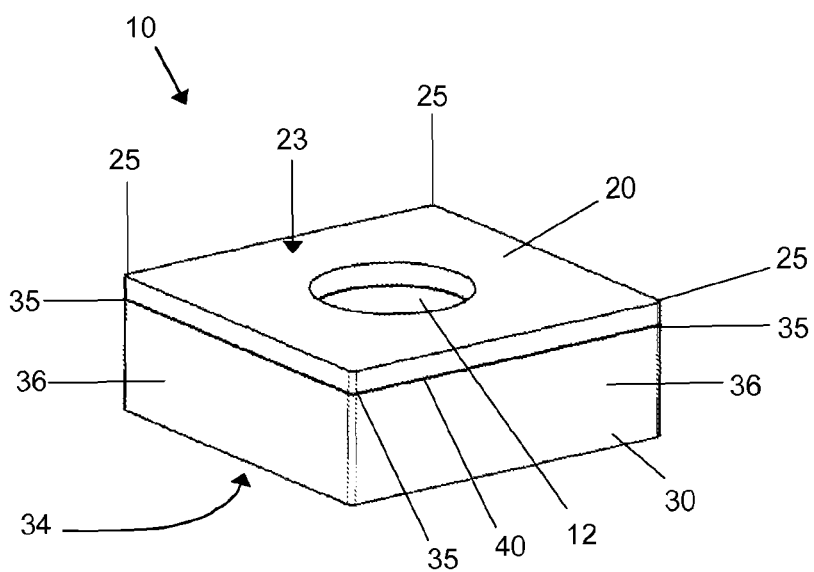
FIG. 1B and FIG. 2B show corresponding perspective views of the respective example constructions in the assembled condition.

With reference to FIG. 1A, FIG. 1B, FIG. 2A and FIG. 2B, an example method of making a construction includes providing a wafer 20 comprising PCBN material, the wafer 20 being unsupported by a cemented carbide substrate and having a mean thickness t of at most 2 mm. An insert base 30 is provided, having a pair of substantially opposite major ends 33, 34 connected by four peripheral sides 36 (only two of which are visible in each of the figures), at least one major end 33 of the insert base 30 configured to have four rounded corners 35 defined by the junctions of respective peripheral sides 36. Corresponding through holes 22, 32 are provided in the wafer 20 and the insert base 30, respectively. The wafer 20 is configured to have four corners 25, also rounded, corresponding to the four corners 35 of the major end 33 of the insert base 30. The wafer 20 is bonded onto the major end 33 of the insert base 30 by means of a layer 40 of braze material, the corners 25 of the wafer 20 being disposed adjacent corresponding corners 35 of the major end 33 to provide the construction. In these examples, a major surface 23 of the wafer 20 has an area of at least about 90% of the area of the major end 33 of the insert base 30. The wafer 20 and the insert base 30 are arranged such that the respective through-holes 22, 32 are substantially co-axial prior to bonding them together to provide respective constructions 10, providing a pin-hole 12 for accommodating a pin (not shown) for securing the assembled and construction insert 10 to a machine tool (not shown).

Figure 2A:
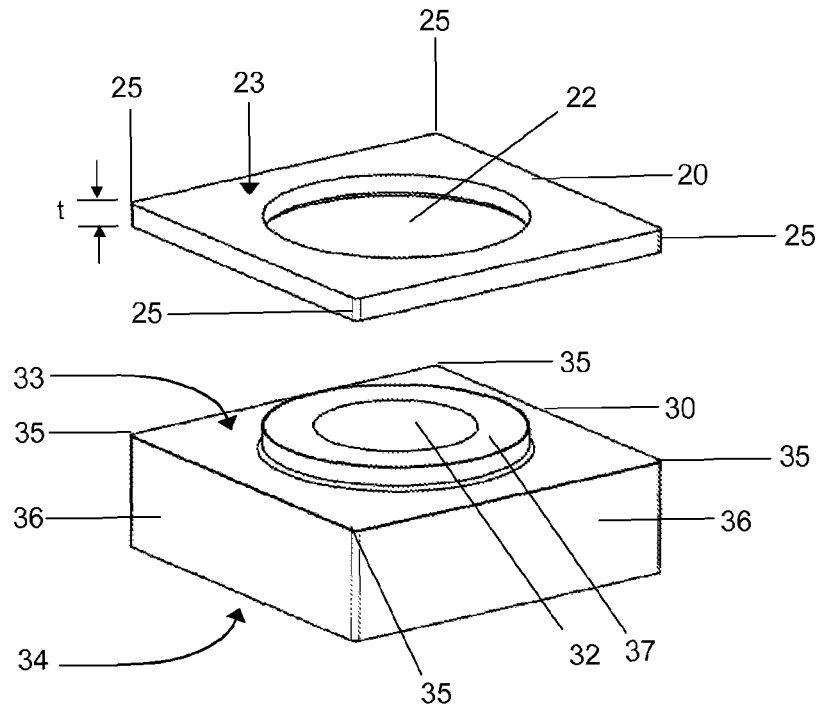
Figure 2B:
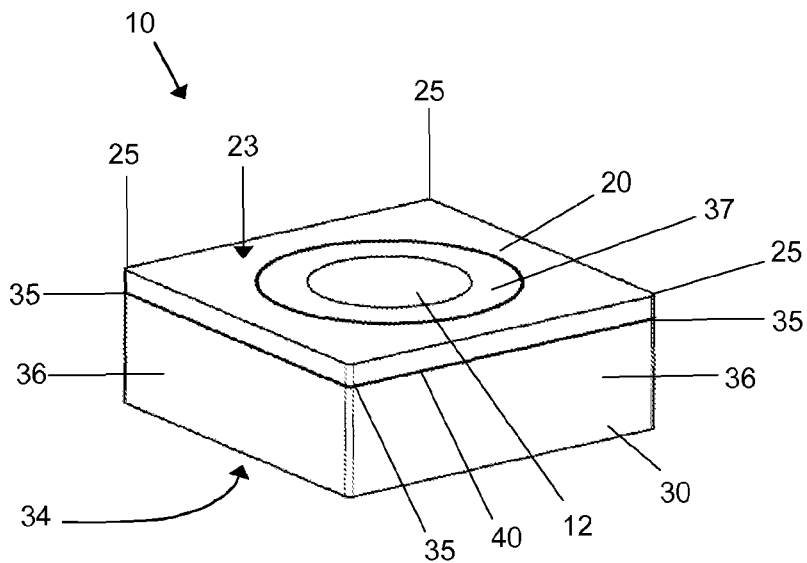

In the particular example arrangement illustrated in FIG. 2A and FIG. 2B, the insert base 30 comprises a guide means 37 for locating the wafer 20 when the wafer 20 is positioned against the insert base 30. The guide means 37 is in the form of an annular protrusion from the insert base 30 adjacent and encircling the through-hole 32 of the insert base 30. The guide means 37 may be inserted into the through hole 22 of the PCBN wafer 20 as the PCBN wafer 20 is brought towards the insert base surface 33.

Figure 3:
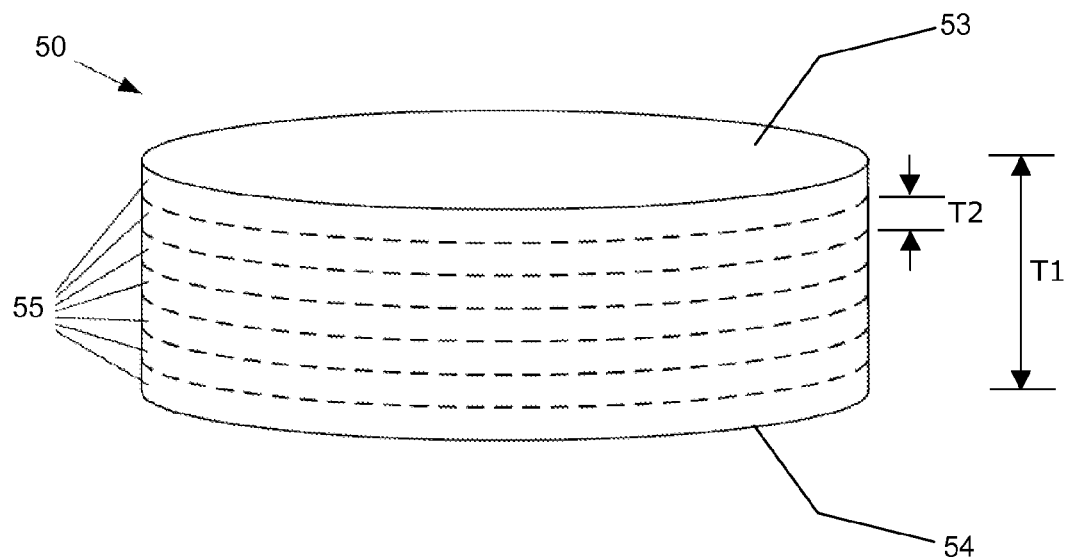
FIG. 3 and FIG. 4 show schematic perspective views of example precursor bodies and an indication of where sub-structures may be cut.

With reference to FIG. 3, an example method includes providing a cylindrical precursor body 50 comprising PCBN material and having a first thickness T1 between a pair of opposite, substantially planar major surfaces 53, 54; cutting the precursor body into seven sub-structure discs 55 having a second thickness T2 between a pair of opposite substantially planar major sub-structure surfaces (the dashed lines indicate where these may be provided by cutting the precursor body 50 substantially parallel to the major planar surfaces 53, 54); the second thickness T2 being less than the first thickness T1. In a particular example arrangement, T1 may be about 14 mm and T2 may be about 1.6 mm to about 2 mm. The precursor body 50 may be cut by means of electro-discharge machining (EDM), for example. The discs 55 may then be processed by further cutting them to provide wafers (not shown). For example, the discs 55 may be cut into rectangular or square wafers having four corners (when viewed from above a major surface).

Figure 4:
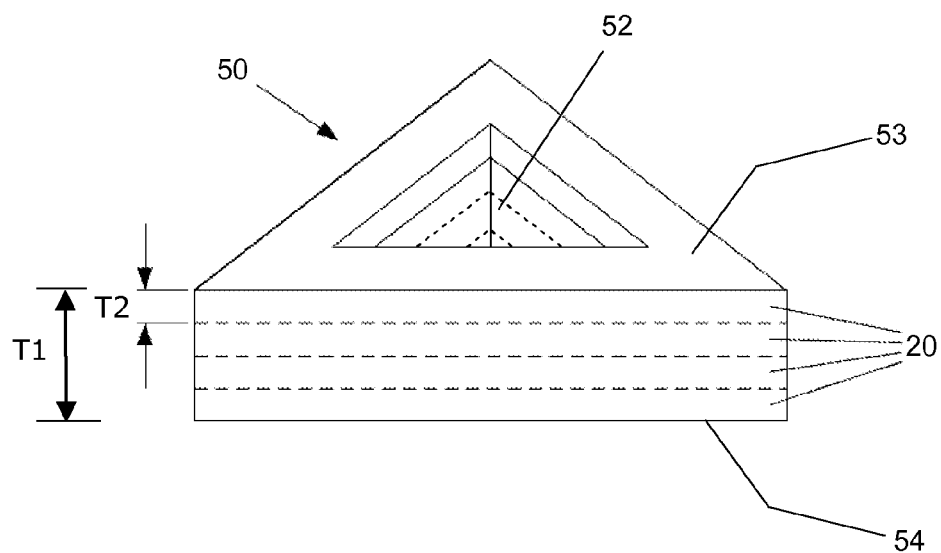

With reference to FIG. 4, a precursor body 50 is in the form of a closed polygonal wall (in this particular example, a triangular wall) and has thickness T1 between a pair of opposite, substantially planar major surfaces 53, 54, being the upper and lower ends of the wall. Put differently, the precursor body 50 has a triangular through-hole 52 connecting the major surfaces 53, 54. In an example method, the precursor body 50 is cut longitudinally with respect to the through-hole 52 (as indicated by the dashed lines) to provide at least four triangular PCBN wafers 20 each having thickness T2, which is less than T1.

The precursor bodies and consequently the sub-structures and wafers form therefrom may comprise a grade of PCBN material that is capable of being cut by means of electro-discharge machining (EDM). Other methods of cutting super-hard structures may include using laser cutting means, diamond wire cutting, abrasive-assisted water-jet cutting and water-jet assisted laser cutting. In one particular example, the method may include cutting a PCBN precursor body by EDM means to form a sheet, and cutting the sheet by laser means to form wafers for joining to accordingly shaped substrates.

The precursor body may comprise PCBN material as described in international application number WO2007049140 and may be manufactured by a method including providing a powdered composition suitable for the manufacture of PCBN, the powder comprising at least 80 volume percent cBN particles and a powdered binder material, and subjecting the powder composition to attrition milling. The composition may comprise cBN particles of more than one average particle size. In one example, the average size of the cBN particles may be at most about 12 microns or at most 2 microns. The binder material may includes one or more of phase(s) containing aluminium, silicon, cobalt, molybdenum, tantalum, niobium, nickel, titanium, chromium, tungsten, yttrium, carbon and iron. The binder material may include powder with uniform solid solution of more than one of aluminium, silicon, cobalt, nickel, titanium, chromium, tungsten, yttrium, molybdenum, niobium, tantalum, carbon and iron. The milled powder combination may then be formed into a pre-sinter body by compacting the powder at an elevated temperature and pressure, and the pre-sinter body may be subjected to an ultra-high pressure of at least about 5 GPa and a temperature of at least about 1,200 degrees centigrade to sinter the powder combination and produce a PCBN body.

Figure 5:
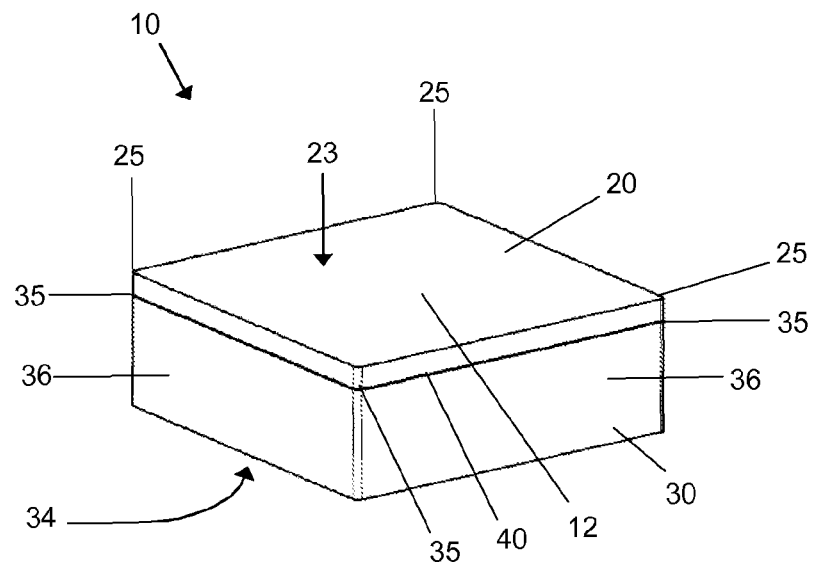
FIG. 5 and FIG. 6 show schematic perspective views of example constructions.
Figure 6:
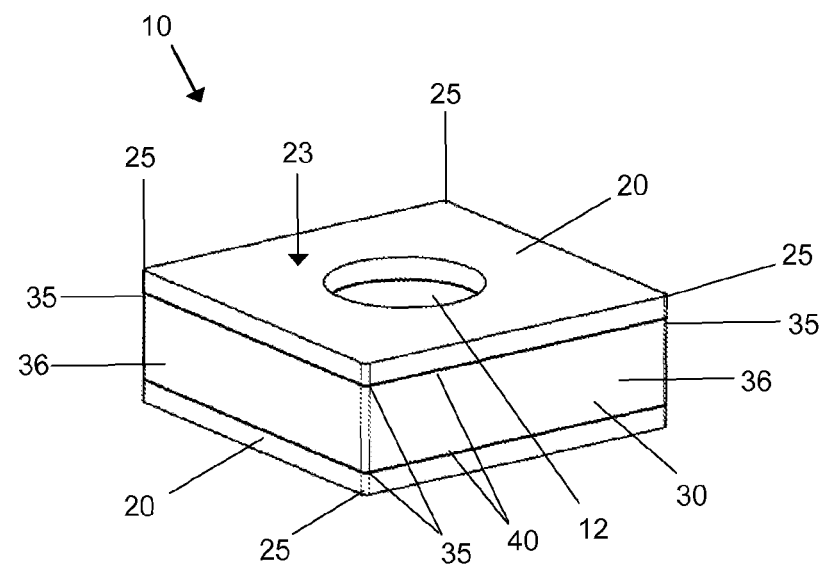

With reference to FIG. 5, an example construction 10 comprises a wafer 20 comprising PCBN material joined to an insert base 30 by means of a layer 40 of braze alloy material, the wafer 20 having a mean thickness of at most 2 mm. The insert base 30 is generally square rhombohedron and the wafer 20 is correspondingly square. The insert base 30 has a pair of opposite major ends connected by four peripheral sides 36, one of the major ends configured to have at four corners 35 defined by respective junctions of the peripheral sides 36. The wafer 20 is also configured to have four corners 25 corresponding to the four corners 35 of the major end of the insert base 30 and the corners 25 of the wafer 20 are placed adjacent corresponding corners 35 of the major end to provide the construction 10. The construction 10 has a pin-hole 12 for accommodating a pin (not shown). The example construction illustrated in FIG. 6 comprises two wafers 20, one bonded to each major end of the insert base 30.

Figure 7:
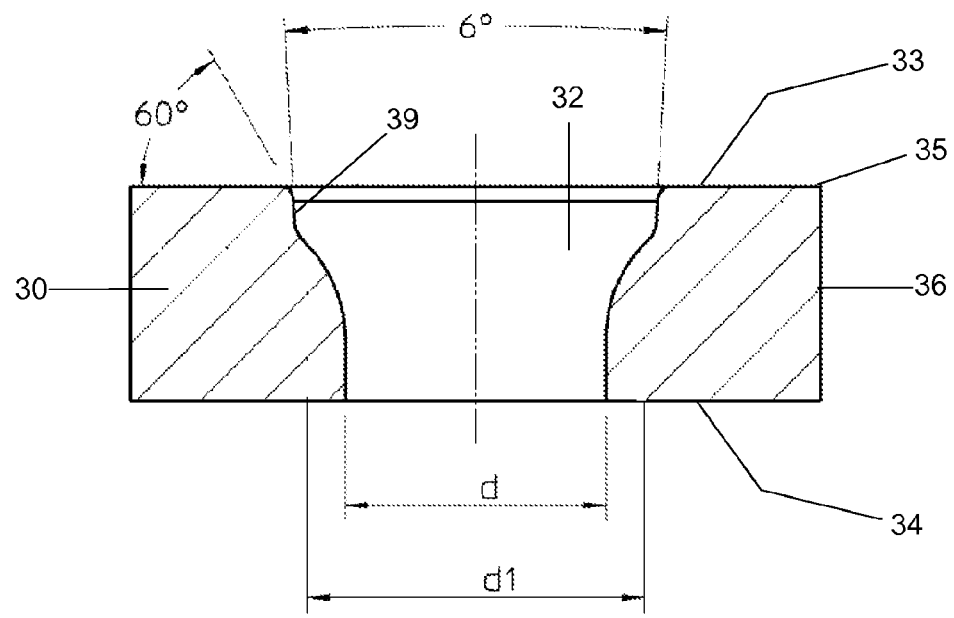
FIG. 7 shows a schematic cross section through an example insert base, showing an example profile of the pin-hole formed in it.

With reference to FIG. 7, an example insert base 30 for an indexable cutter insert may have a central through-hole 32 between the opposite major end surfaces 33, 34, which are connected by side surfaces 36. The diameter of the opening of the through-hole 32 is greater on one end 33 than on the other end 34, the greater diameter being d1 and the smaller diameter being d. In this particular example, the through-hole 32 comprises a generally tapered wall 39 at least proximate the opening having the larger diameter d2, and has a bevelled or chamfered edge at the mouth of the larger opening. The shape of the through-hole 32 is configured to accommodate a pin (not shown) for fastening the cutter insert to a machine tool such that a head portion of the pin fits into a wider portion defined by the generally tapered inner wall 39.

Example insert bases may comprise material having a Vickers hardness of at least about 1,200 HV and a thermal expansion coefficient of less than about $6.5 \times 10^{-6}/C.°$ and may comprise cemented carbide or cermet material.

Figure 8:
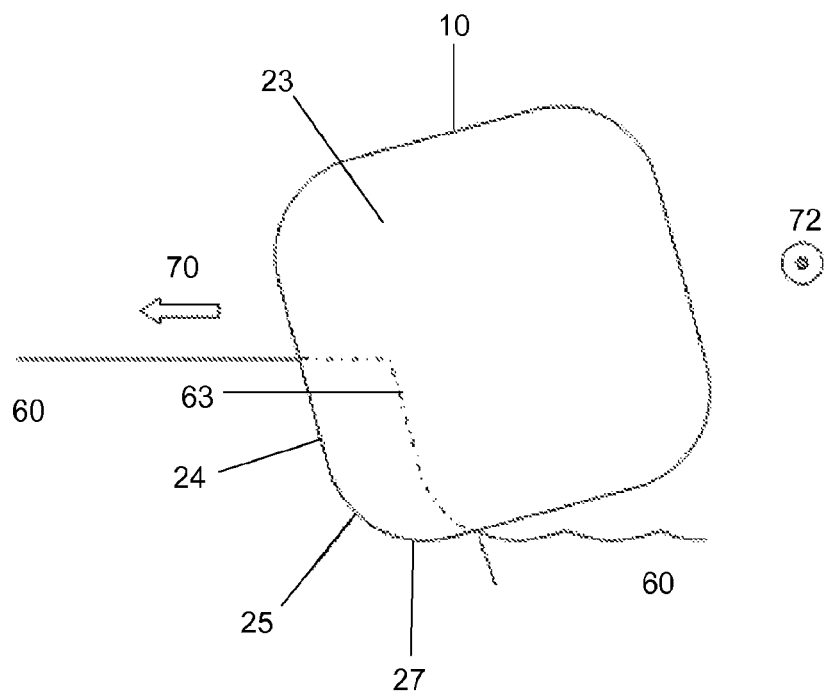
FIG. 8 shows a schematic plan view of an example indexable cutter insert as in use cutting a workpiece.

With reference to FIG. 8, an example indexable cutter insert 10 comprises a major rake surface 23, primary cutting edge 24 and secondary cutting edge 27 formed by a PCBN wafer, and a rounded corner 25 at the junction of the primary and secondary cutting edges 24, 27. In use as illustrated schematically by the figure, the cutter insert 10 may be caused to move relative to a workpiece 60 in the direction indicated by vector 72 (i.e. out of the page) and in a feed direction 70, to remove portion 63 of the workpiece 60 immediately in the path of the cutter insert 10.

An example arrangement is described in more detail with reference to the example below.

An insert base comprising cobalt cemented tungsten carbide was provided, the substrate in the general form of a square disc having two opposite major ends connected by a peripheral surface. A through-hole was provided through the substrate, extending between the centres of the respective major ends. The length of the sides of the major ends was about 12 mm, the thickness of the insert base was about 5 mm and the diameter of the through-hole was about 6 mm. The lengths of the sides were slightly greater than they would be in the finished product to allow for grinding to final dimensions prior to mounting onto a tool holder.

A PCBN wafer having generally square major surfaces corresponding to the dimensions of the major surfaces of the insert base was cut from a PCBN precursor body by means of electro-discharge machining (EDM). The PCBN precursor body comprised about 50% volume percent cBN grains having a mean grain size of about 1.5 microns, bonded together by a binder material comprising titanium carbide. The PCBN precursor body was produced by sintering a mixture of cBN grains and precursor components for the binder material at a pressure of at least about 5 GPa and a temperature of at least about 1,200 degrees centigrade, as is known in the art.

A through-hole was formed through the PCBN wafer by means of laser cutting. The through-hole was positioned at the centre of the wafer to correspond with the through-hole of the insert base, and the diameter of the wafer through-hole was 6 mm, slightly greater than that of the insert base through-hole.

A layer of braze alloy material comprising an alloy of titanium, copper and silver was placed onto one of the major ends of the insert base, covering the entire end (apart from the through hole) and the wafer was placed onto the layer of braze alloy material, positioned such that the wafer through-hole and the insert base through-hole were substantially co-axial and the sides of the wafer were aligned with those of the insert base. This assembly was heated to melt the braze alloy material by means of a tube furnace to a temperature of about 450 degrees centigrade in steps of 2 degrees per minute, subsequently it is heated to a temperature of about 950 degrees in steps of 4 degrees per minute. The insert is then left to cool within the furnace, thereby joining the PCBN wafer securely to the insert base to form a construction for a cutter insert.

The construction was processed to final dimensional and finish specifications to produce a finished PCBN cutter insert.

Certain terms and concepts as used herein are briefly explained below.

As used herein, an "indexable cutter insert" is a cutter insert comprising more than one cutting edge and that is configured to be mountable onto a tool body in more than one discrete orientation suitable for using each of the respective cutting edges to cut a workpiece. Once a cutting edge is excessively worn, it may be mounted onto the tool body in a different orientation (i.e. "indexed") so that another edge may be used for further cutting.

A ceramic material is an inorganic solid that is non-metallic in character, although it may include metal elements, particularly in compound form. Non-exhaustive examples of ceramic materials are polycrystalline cubic boron nitride (PCBN), alumina, silicon carbide, silicon nitride, titanium carbide, tantalum carbide. As used herein, PCBN (polycrystalline cubic boron nitride) material refers to a type of super-hard material comprising grains of cubic boron nitride (cBN) dispersed within a matrix comprising metal or ceramic. Advanced ceramic material is a ceramic material has hardness greater than that of cemented tungsten carbide. PCBN and polycrystalline diamond (PCD) material are example of super-hard material, which is ceramic material having a Vickers hardness of at least about 28 GPa. Polycrystalline diamond (PCD) material comprises a mass of diamond grains, a substantial portion of which are directly inter-bonded with each other and in which the content of diamond is at least about 80 volume percent of the material. In one embodiment of PCD material, interstices between the diamond grains may be at least partly filled with a binder material comprising a catalyst for diamond. As used herein, "interstices" or "interstitial regions" are regions between the diamond grains of PCD material. In embodiments of PCD material, interstices or interstitial regions may be substantially or partially filled with a material other than diamond, or they may be substantially empty. Embodiments of PCD material may comprise at least a region from which catalyst material has been removed from the interstices, leaving interstitial voids between the diamond grains, which is likely to increase the thermal stability of the PCD material. Thermally stable PCD comprises at least a part or volume of which exhibits no substantial structural degradation or deterioration of hardness or abrasion resistance after exposure to a temperature above about 400 degrees centigrade.

A machine tool is a powered mechanical device, which may be used to manufacture components comprising materials such as metal, composite materials, wood or polymers by machining, which is the selective removal of material from a body, called a workpiece. A rake face of a cutter insert is the surface or surfaces over which the chips flow when the tool is used to remove material from a body, the rake face directing the flow of newly formed chips. Chips are the pieces of a body removed from the work surface of the body by a machine tool in use. A flank of a cutter insert is the surface or surfaces of the machine tool that passes over the machined surface produced on the body by a machine tool. The flank may provide a clearance from the body and may comprise more than one flank face. A cutting edge is the edge of a rake face suitable for performing cutting of a body, and may be the edge defined by the intersection of the rake and a clearance face. A peripheral edge of a cutter or construction for a cutter is an outer edge of a surface of the cutter or construction for a cutter, which may be a cutting edge or may be formed into a cutting edge. A nose or corner of a cutting tool is the tip of a cutting edge of a tool is a region of the tool including at least a secondary cutting edge and some portion of a primary cutting edge. The corner may be straight, rounded or the actual intersection of the primary and secondary cutting edges.

The invention claimed is:

1. A method of making a construction for an indexable cutter insert, the method including
providing an insert base having proximate and distal major ends connected by peripheral sides, the proximate end of the insert base being configured to have at least two corners defined by junctions of the peripheral sides;
providing a precursor body comprising a grade of PCBN material that is capable of being cut by means of electro-discharge machining, and having a first thickness between a pair of opposite major end surfaces;
cutting the precursor body into 2 to 10 sub-structures, each having a volume of substantially 50 percent down to 10 percent, respectively, of the volume of the precursor body,
the sub-structures comprising the grade of PCBN material, having a second thickness between a pair of opposite major sub-structure surfaces, the second thickness being less than the first thickness;
in which the major sub-structure surfaces are cut to correspond to a major surface of the precursor body, the major sub-structure surfaces being substantially parallel to or inclined at an angle of at most 45 degrees to at least one of the major surfaces of the precursor body;
cutting at least one of the sub-structures to provide a wafer comprising the grade of PCBN material, the wafer being unsupported by a cemented carbide substrate, having a mean thickness of at most 2 mm, and
the wafer being configured to have at least two corners corresponding to the two corners of the proximate end of the insert base;
the method including bonding the wafer to the proximate end of the insert base using a bond material, the corners of the wafer being disposed adjacent the corresponding corners of the proximate end to provide the construction.

2. A method as claimed in claim 1, in which the proximate major end includes a pocket for accommodating the wafer.

3. A method as claimed in claim 1, in which the proximate end of the insert base has at least three corners defined by junctions of peripheral sides and the wafer is configured to have at least three corners corresponding to the corners of the proximate end of the insert base.

4. A method as claimed in claim 1, in which a major surface of the wafer has an area at least 50 percent of the area of the proximate end of the insert base.

5. A method as claimed in claim 1, including forming a through-hole into the wafer prior to bonding the wafer to the insert base.

6. A method as claimed in claim 5, including providing an insert base having a through-hole between the proximate and distal ends; arranging the wafer and the insert base such that the respective through-holes are substantially co-axial, and bonding the wafer to the insert base by means of bond material.

7. A method as claimed in claim 1, in which the wafer has a mean thickness of at most 1.6 mm.

8. A method as claimed in claim 1, including providing a cemented carbide insert base having a through-hole between two opposite surfaces; providing a body comprising PCBN material and sawing off a portion of the body to provide a PCBN wafer; forming a through-hole into the PCBN wafer; arranging the PCBN wafer and the substrate such that the respective through-holes are substantially co-axial; disposing a layer of braze alloy material between a surface of the substrate and the PCBN wafer; and brazing the PCBN wafer to the substrate.

9. A method as claimed in claim 8, including using an EDM apparatus to saw off the portion of the body.

10. A method as claimed in claim 8, in which the PCBN wafer has a mean thickness of less than 1 mm.

11. A method of making a construction for an indexable cutter insert, the method including
providing a wafer comprising ceramic material, the wafer being substantially unsupported by a cemented carbide substrate and having a mean thickness of at most 2 mm;
providing an insert base having proximate and distal major ends connected by peripheral sides, the proximate end of the insert base being configured to have at least two corners defined by junctions of the peripheral sides;
the wafer being configured to have at least two corners corresponding to the two corners of the proximate end of the insert base;
the method including bonding the wafer to the proximate end by means of a bond material, the corners of the wafer being disposed adjacent the corresponding corners of the proximate end to provide the construction;
in which the ceramic material is PCBN material;
the wafer being provided by a method including
providing a precursor body comprising ceramic material and having a first thickness between a pair of opposite major end surfaces;
cutting the precursor body into a plurality of sub-structures to provide at least one sub-structure having a second thickness between a pair of opposite major sub-structure surfaces;
in which the major sub-structure surfaces are cut to correspond to a major surface of the precursor body, the major sub-structure surfaces being substantially parallel to or inclined at an angle of at most 45 degrees to at least one of the major surfaces of the precursor body;
the second thickness being less than the first thickness; and
processing the sub-structure to provide the wafer.

12. A method of making a construction for an indexable cutter insert, the method including:
a) providing an insert base having proximate and distal major ends connected by peripheral sides, the proximate end of the insert base being configured to have at least two corners defined by junctions of the peripheral sides;
b) providing a precursor body comprising PCBN material having a first thickness between a pair of opposite major end surfaces;
c) cutting the precursor body into a plurality of sub-structures to provide at least one sub-structure having a second thickness between a pair of opposite major sub-structure surfaces, the second thickness being less than the first thickness; in which the major sub-structure surfaces are cut to correspond to a major surface of the precursor body, the major sub-structure surfaces being substantially parallel to or inclined at an angle of at most 45 degrees to at least one of the major surfaces of the precursor body;
d) processing the sub-structure to provide a substantially unsupported wafer having a mean thickness of at most 2 mm, and being configured to have at least two corners corresponding to the two corners of the proximate end of the insert base; and
e) bonding the wafer to the proximate end of the insert base using a bond material, the corners of the wafer being disposed adjacent the corresponding corners of the proximate end to provide the construction.

* * * * *